United States Patent [19]

Caser et al.

[11] Patent Number: 5,754,476
[45] Date of Patent: May 19, 1998

[54] NEGATIVE CHARGE PUMP CIRCUIT FOR ELECTRICALLY ERASABLE SEMICONDUCTOR MEMORY DEVICES

[75] Inventors: Fabio Tassan Caser, Milan; Marco Dallabora, Carpiano; Marco Defendi, Sulbiate, all of Italy

[73] Assignee: SGS-Thomson Microelectronics S.r.l., Agrate Brianza, Italy

[21] Appl. No.: 751,299

[22] Filed: Oct. 31, 1996

[30] Foreign Application Priority Data

Oct. 31, 1995 [EP] European Pat. Off. ............ 95830456

[51] Int. Cl.$^6$ .................................................. G11C 16/04
[52] U.S. Cl. ........................... 365/185.29; 365/185.18; 327/536; 327/540
[58] Field of Search ..................... 365/185.18, 185.27, 365/185.29; 327/536, 540

[56] References Cited

U.S. PATENT DOCUMENTS

| | | | |
|---|---|---|---|
| 5,059,815 | 10/1991 | Bill et al. | 307/246 |
| 5,168,174 | 12/1992 | Naso et al. | 307/296.6 |
| 5,180,928 | 1/1993 | Choi | 307/296.6 |
| 5,282,170 | 1/1994 | Van Buskirk et al. | 365/226 |
| 5,291,446 | 3/1994 | Van Buskirk et al. | 365/189.09 |
| 5,335,200 | 8/1994 | Coffman et al. | 365/218 |
| 5,352,936 | 10/1994 | Allen | 307/304 |
| 5,392,253 | 2/1995 | Atsumi et al. | 365/230.06 |
| 5,394,372 | 2/1995 | Tanaka et al. | 365/226 |
| 5,422,590 | 6/1995 | Coffman et al. | 327/537 |
| 5,513,146 | 4/1996 | Atsumi et al. | 365/185.23 |
| 5,532,915 | 7/1996 | Pantelakis et al. | 363/60 |

FOREIGN PATENT DOCUMENTS 0 450 797  10/1991  European Pat. Off. ........ H01L 27/02

*Primary Examiner*—David C. Nelms
*Assistant Examiner*—Hien Nguyen
*Attorney, Agent, or Firm*—David V. Carlson; Bryan A. Santarelli; Seed and Berry LLP

[57] ABSTRACT

A negative charge pump circuit having a plurality of charge pump stages. Each charge pump stage has an input node and an output node and includes a pass transistor and a first coupling capacitor. The pass transistor has a first terminal connected to the input node, a second terminal connected to the output node and a control terminal connected to an internal node of the charge pump stage. The first coupling capacitor has a first plate connected to said output node and a second plate connected to a respective clock signal. Negative voltage regulation means are provided for regulating a negative output voltage on an output node of the negative charge pump circuit to provide a fixed negative voltage value. The negative charge pump circuit includes at least one negative voltage limiting means electrically coupling said output node of the negative charge pump circuit with the internal node of the last charge pump stage of the negative charge pump circuit. The negative voltage limiting means limits the negative voltage on the internal node and on the output node of said last charge pump stage.

22 Claims, 2 Drawing Sheets

NEGATIVE CHARGE PUMP CIRCUIT FOR ELECTRICALLY ERASABLE SEMICONDUCTOR MEMORY DEVICES

TECHNICAL FIELD

The present invention relates to a negative charge pump circuit for electrically erasable semiconductor memory devices, particularly Flash Electrically Erasable and Programmable ROMs (Flash EEPROMs).

BACKGROUND OF THE INVENTION

It is known that Flash EEPROM memory cells are formed by floating-gate MOSFETs, with a polysilicon floating gate insulatively placed over a channel region with the interposition of a thin oxide layer (gate oxide) and a polysilicon control gate insulatively placed over the floating gate with the interposition of an intermediate dielectric layer (interpoly dielectric). A Flash EEPROM memory cell is programmed or written by means of injection of hot electrons from the channel region into the floating gate, and can be electrically erased by means of Fowler-Nordheim tunneling of electrons from the floating gate to the source region through the gate oxide. To activate Fowler-Nordheim tunneling, a sufficiently high electric potential difference between the source region and the floating gate must be created, to develop a strong electric field in the gate oxide.

A known erasing biasing technique of the memory cells provides for applying a relatively high negative potential, ranging from −12 V to −17 V, to the control gate of the memory cells, and a relatively low positive potential, ranging from 0.5 V to 5 V, to the source regions. The negative potential is generated directly on-chip by means of a suitable charge pump circuit.

Negative power supplies for generating the negative potential to be applied to the control gates of the memory cells during erasing are known to include a negative pump circuit designed to provide, at an output node, a negative voltage of approximately −12 V.

The negative pump circuit is made up of a number of stages, each one substantially comprising a P-channel pass MOSFET and a coupling capacitor. The coupling capacitors in each stage are driven by respective clock signals substantially out-of-phase by a half period. The capacitors are MOS type, i.e., they are P-channel MOSFETs with source shorted to drain: a first plate of the each capacitor is formed by the gate electrode of the P-channel MOSFET, and a second plate is instead formed by the inversion layer which forms the channel of the MOSFET; the dielectric is formed by the gate oxide of the P-channel MOSFET.

The voltages of the internal nodes of the pump circuit become more and more negative going from the first stage to the last stage, and can reach values as low as −18 V. Such a voltage is near the breakdown voltage of the junctions, and can further be sufficient to break the gate oxide of the P-channel MOSFETs forming the capacitors.

To prevent the latter problem, the capacitors in the final stages are generally stacked capacitors, i.e., they comprise two series-connected capacitors. This obviously causes an increase of the area occupied by the negative charge pump circuit.

SUMMARY OF THE INVENTION

In view of the state of the art described, it is an object of the present invention to provide a negative charge pump circuit which is not affected by the above-mentioned drawbacks.

According to the present invention, such object is attained by means of a negative charge pump circuit comprising a plurality of charge pump stages. Each charge pump stage has an input node and an output node and includes a pass transistor and a first coupling capacitor. The pass transistor has a first terminal connected to the input node, a second terminal connected to the output node and a control terminal connected to an internal node of the charge pump stage. The first coupling capacitor has a first plate connected to the output node and a second plate connected to a respective clock signal.

A negative voltage regulator circuit is provided for regulating a negative output voltage on an output node of the negative charge pump circuit to a fixed negative voltage value. The negative voltage regulation means comprises at least one negative voltage limiting means electrically coupling the output node of the negative charge pump circuit with the internal node of the last charge pump stage of the negative charge pump circuit to limit the negative voltage on the internal node and on the output node of the last charge pump stage.

Thanks to the present invention, it is possible to limit the negative voltage on the internal nodes of the negative charge pump circuit to values suitable to not cause junction breakdown. Also, thanks to the present invention, it is possible to limit the negative voltages across the capacitors of the negative charge pump circuit to values suitable to not cause damages to the dielectric layer of the capacitors.

These and other features of the present invention will be made apparent from the following detailed description of a particular embodiment, described as a nonlimiting example in the annexed drawings.

DETAILED DESCRIPTION OF THE DRAWINGS

Figure 1:
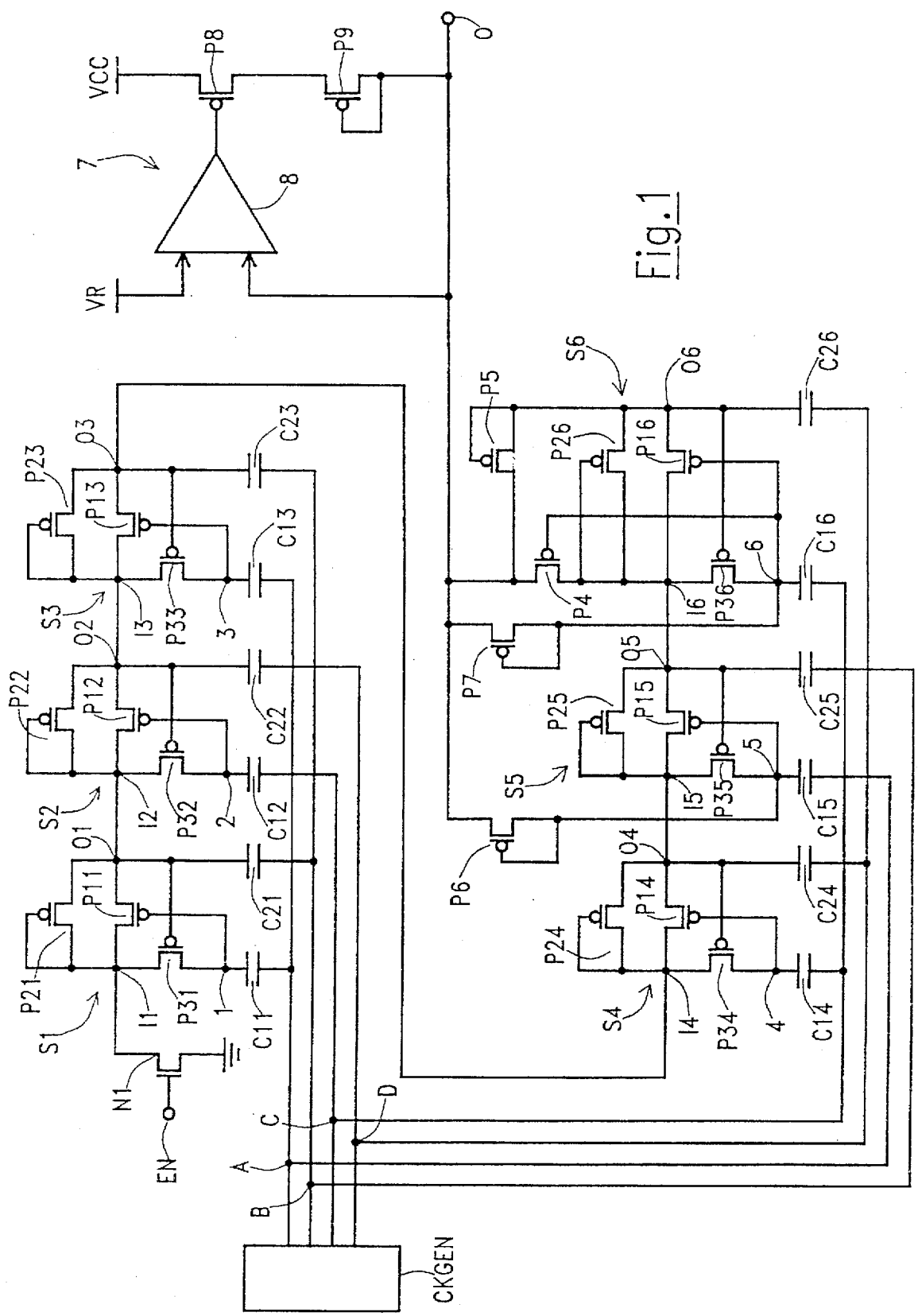
FIG. 1 is a circuit diagram of a negative charge pump circuit according to the present invention.

Referring to FIG. 1, a negative charge pump circuit according to the present invention comprises six stages S1–S6. The first five stages S1–S5 are substantially identical to each other, the last stage S6 is an output stage.

Each one of the six stages S1–S6 of the negative charge pump circuit has an input node I1-16 and an output node O1-O6. In the intermediate stages, the output node of each stage is connected to the input node of the following stage. Each stage comprises a P-channel pass MOSFET P11-P16, a P-channel initialization MOSFET P21-P26, a P-channel pre-charge MOSFET P31-P36, a first coupling capacitor C11-C16 and a second coupling capacitor C21-C26.

In each one of the stages S1–S6, the pass MOSFET P11-P16 has its source connected to the input node I1-I6, its drain connected to the output node O1–O6, and its gate connected to an internal node 1-6 to which a first plate of the first coupling capacitor C11-C16 is also connected. The initialization MOSFET P21-P26 is diode-connected, having its drain and gate short-circuited to each other and connected to the input node I1-I6. The source of the initialization MOSFET P21-P26 is connected to the output node O1-O6.

The pre-charge MOSFET P31-P36 has its source connected to the input node I1-I6, its drain connected to the internal node 1-6 and its gate connected to the output node O1-O6. The second coupling capacitor C21-C26 has a first plate connected to the output node O1-O6.

The first coupling capacitors C11, C13 and C15 and the second coupling capacitors C21, C23 and C25 of the first, third and fifth stages S1, S3, S5 have a second plate connected to a first clock signal A and to a second clock signal B, respectively.

The first coupling capacitors C12 and C14 and the second coupling capacitors C22, C24 and C26 of the second, fourth and sixth stages S2, S4, S6 have a second plate connected to a third clock signal C and to a fourth clock signal D, respectively.

Figure 2:
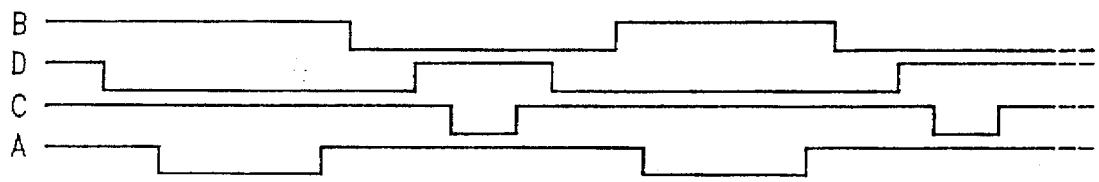
FIG. 2 is a time diagram of clock signals driving the negative charge pump circuit of FIG. 1.

The four clock signals A, B, C and D are generated by a clock generator CKGEN according to the timing diagram shown in FIG. 2. The first and second clock signals A, B, as well as the third and fourth clock signal C, D, are substantially isofrequential signals out of phase of half a period, and vary between 0 V and a positive voltage supply VCC (i.e., the 5 V supply of the memory device). Clock generator CKGEN is a type of circuit that is well known in the art and is used in prior art EEPROMs. The internal details of this circuit does not constitute the invention and any suitable such circuit is acceptable. A person of skill in the art would be able to use such a known circuit to provide the requested signals based on the disclosure of the present invention.

According to a known solution, the coupling capacitors C11-C16 and C21-C26 are MOS capacitors, more particularly they are P-channel MOSFETs with source shorted to drain. The first plate of the capacitors is the gate, the second plate is the inversion layer forming the channel region of the MOSFET, and the dielectric is the gate oxide layer of the MOSFETs.

The final stage S6 of the negative charge pump circuit further comprises a P-channel pass MOSFET P4 and a P-channel diode-connected MOSFET P5. The pass MOSFET P4 has the source connected to the input node 16, drain connected to an output node O of the negative charge pump circuit, and gate connected to the internal node 6. The diode-connected MOSFET P5 has the gate and the drain connected to the output node O6 of the sixth stage S6 and the source connected to the output node O of the negative charge pump circuit.

A first voltage limiter, formed by a diode-connected P-channel MOSFET P6, has the drain and the gate connected to the internal node 5 of the fifth stage S5 and the source connected to the output node O of the negative charge pump circuit. A second voltage limiter, also formed by a diode-connected P-channel MOSFET P7, has the drain and the gate connected to the internal node 6 of the sixth stage S6 and the source connected to the output node O of the charge pump circuit.

The input node 1 of the first stage SI forms an input node of the charge pump circuit. The input node I is coupled to a lower power supply potential (for example the ground voltage) through an N-channel pump enable transistor Ni controlled by a pump enabling signal EN. When not in erase mode, the enabling signal EN is low, the enable transistor Ni is off and no current path to the ground voltage exists. Additionally, when Ni is off the output O of the charge pump circuit is tied to the positive voltage supply VCC. In the erase mode, when the negative charge pump circuit must be activated, the enabling signal EN goes high turning the enable transistor N1 on; this creates a current path to the ground voltage.

Also shown in FIG. 1 is a negative voltage regulation circuit. The regulation circuit substantially comprises an operational amplifier 8 comparing the voltage V(O) at the output node O of the charge pump circuit with a reference voltage VR. The operational amplifier 8 controls, according to the difference between V(O) and VR, the conduction state of a P-channel MOSFET P8 and a diode-connected P-channel MOSFET P9. The P-channel MOSFET P8 has its source connected to the positive voltage supply VCC (i.e., the 5 V supply) and its drain connected to the source of a diode-connected P-channel MOSFET P9 with its drain connected to the output node O of the charge pump. The negative voltage regulation circuit 7 regulates the output voltage V(O) of the charge pump circuit to a predefined voltage of, for example, −11 V.

It is assumed that the clock signals A and B are initially both at the high level as illustrated in FIG. 2. When the signal EN goes high, the input node I1 is pulled to the ground voltage. The initialization MOSFET P21 causes the voltage V(O1) on node O1 to be one threshold voltage above the voltage V(I1) on node I1. The precharge MOSFET P31 causes the voltage V(1) on node 1 to be one threshold voltage above V(O1). The pass MOSFET P11 is off.

When the signal A goes low, V(1) drops by 5 V, thus turning P11 strongly on; the voltage V(I1) is thus completely transferred to node O1. Also, P21 and P31 are turned off. Then the signal A goes back to the high level, turning P11 off again.

When the signal B goes low, the voltage V(O1) is pumped to −4.5 V.

Similarly, the output node O2 of the second stage S2 will be pumped by the clock signals C and D to a voltage V(O2) more negative than V(O1) (V(O2)=−8 V), the output node O3 of the third stage S3 will be pumped by the clock signals A and B to a voltage V(O3) more negative than V(O2) (V(O3)=−12 V), the output node O4 of the fourth stage S4 will be pumped by the clock signals C and D to a voltage V(O4) more negative than V(O3) (V(O4)=−16 V), and so on. That is, the output of a given stage is pumped by the respective clock signals to a voltage more negative than the output voltage of the preceding stage.

In each stage, the initialization MOSFET P21-P26, the pre-charge MOSFET P31-P36 and the first coupling capacitor C11-C16 are voltage drop cancellation means which allow to transfer the whole voltage on the input node I1-I6 of the respective stage to the output node O1-O6 canceling out the voltage drop (corresponding to the threshold voltage) on the pass MOSFET P11-P16.

The diode-connected MOSFETs P6 and P7 limits the negative voltage on the internal nodes 5 and 6, respectively, to a value not lower than V(O)−VT, where VT is the threshold voltage of the P-channel MOSFET P6 and P7. The negative voltage on the internal nodes 5 and 6 is thus limited to −11 V−VT, and also the negative voltage V(O5) and V(O6) on the output nodes of the fifth and sixth stages S5, S6 is limited to −11 V−VCC.

If the two MOSFETs P6 and P7 were not provided, the voltage on the internal nodes 5 and 6 would attain values near to the breakdown voltage of the junction between the source/drain regions of the MOSFETs and the substrate (a typical value of the breakdown voltage is −18 V).

Another problem of having too high negative voltages on the internal nodes of the charge pump circuit is that since the coupling capacitors are MOS capacitors, as previously described, the gate oxide layer forming the dielectric of the capacitors cannot sustain voltages of the order of −18 V or even less without breaking down. To prevent this from occurring, it would be necessary to use, at least in the final stages of the charge pump circuit, two serially-connected capacitors, so that the negative voltage can be partitioned. This however determines an increase in the overall area occupied by the charge pump circuit. Thanks to the two voltage limiters P6 and P7, the voltage across the coupling capacitors can be limited to values sufficiently low to prevent breaking of the dielectric oxide layer. Thus, it is not necessary to provide serially-connected capacitors, and the area of the charge pump circuit is reduced.

The diode-connected MOSFETs P6 and P7 also allow to charge the internal nodes 5 and 6 to VCC - VT when, at the end of the erase operation, the output O of the charge pump circuit is tied to VCC.

It is to be noted that even if in the described embodiment of FIG. 1 which shows two voltage limiters, only one voltage limiter could be provided in the last charge pump stage of the charge pump circuit if the negative voltages in the remaining stages do not attain negative values that are too high. For example, a charge pump circuit with fewer stages would only have one charge pump stage 55, stage 56 could be removed. On the contrary, in negative charge pump circuits with more stages, it could be desirable to have voltage limiters also in more charge pump stages than the last two, for example in the last three stages.

Figure 3:
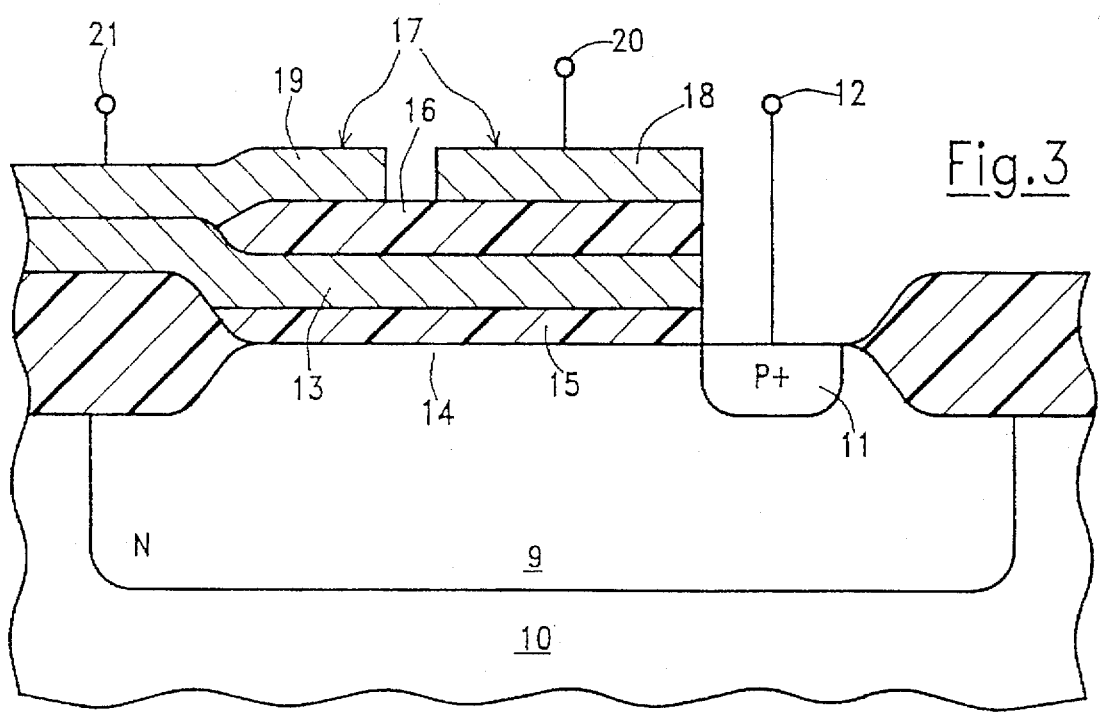
FIG. 3 shows a preferred physical structure for the capacitors of the negative charge pump circuit of FIG. 1.

In a preferred embodiment of the invention, all or at least some, for example those in the final stages S4–S6 of the charge pump circuit of the coupling capacitors have the structure shown in FIG. 3. They comprise an active area formed by an N type well region 9 in a substrate 10 and a heavily doped P type region 11 which forms a first external terminal 12 of the capacitor. A polysilicon layer 13, which is part of the same layer forming the floating gate of the Flash EEPROM memory cells, is insulated from the underlying channel region 14 by means of an oxide layer 15. Oxide layer 15 is part of the gate oxide layer insulating the floating gate from the channel region of the Flash EEPROM memory cells. An insulator layer 16 insulates a second polysilicon layer 17 from the first polysilicon layer 13. An oxide layer, or any other kind of interpoly layer normally used in the field of non-volatile memories, such as an Oxide-Nitride-Oxide sandwich or a Nitride-Oxide stack, can be used for insulator layer 16. The second polysilicon layer is part of the same layer which forms the control gate of the Flash EEPROM memory cells, and the insulator layer 16 is part of the same layer which forms the interpoly dielectric layer of the Flash EEPROM memory cells. As illustrated in FIG. 3, the second polysilicon layer 17 is interrupted, so that one portion 18 of it is effectively insulated from the first polysilicon layer 13, and another portion 19 contacts the first polysilicon layer 13 where the interpoly dielectric layer 16 is absent. The portion 18 forms a second external terminal 20, and the portion 19 forms an intermediate terminal 21. It is evident that this capacitor structure can be integrated without adding steps to the manufacturing process in any MOS integrated device with two levels of polysilicon layer, such as a Flash EEPROM.

Figure 4:
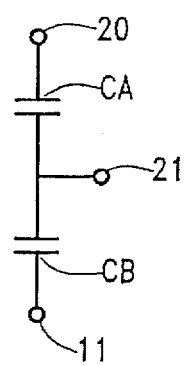
FIG. 4 is an electrically equivalent diagram of the capacitors shown in FIG. 3.

FIG. 4 is an electric equivalent diagram of the structure of FIG. 3. As visibile, the structure of FIG. 3 is equivalent to two capacitors CA and CB having a common plate. Capacitor CA is formed by the portion 18 of the second polysilicon layer 17, the interpoly dielectric layer 16 and the first polysilicon layer 13, short-circuited to the portion 19 of the second polysilicon layer 17. Capacitor CB is formed by the first polysilicon layer 13, the gate oxide layer 15 and the channel region 14. The structure is thus equivalent to two serially-connected capacitors, and can be used in the final stages S4–S6 of the charge pump circuit where the voltages on the internal nodes are more negative. It would be appreciated that this structure is more compact than two conventional capacitors connected in series. Preferably, the interpoly dielectric layer 16 has the same thickness as the gate oxide layer 15, so that capacitors CA and CB have a same capacitance per unit area.

Thanks to the fact that the structure of FIG. 3 has three terminals, it can advantageously be used also in the first stages S1–S3 of the charge pump circuit: the two capacitors CA and CB can be connected in parallel short-circuiting the terminals 11 and 20, thus obtaining with a small occupation of area a capacitor equal to CA+CB.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A negative charge pump circuit, comprising:
   a plurality of charge pump stages, each charge pump stage having an input node and an output node and comprising a pass transistor and a first coupling capacitor, the pass transistor having a first terminal connected to the input node, a second terminal connected to the output node and a control terminal connected to an internal node of the charge pump stage, said first coupling capacitor having a first plate connected to said output node and a second plate connected to a respective clock signal; and
   negative voltage regulation means for regulating a negative output voltage on an output node of the negative charge pump circuit to provide a fixed negative voltage value, comprising at least one negative voltage limiting means electrically coupling said output node of the negative charge pump circuit with the internal node of the last charge pump stage of the negative charge pump circuit to limit the negative voltage on said internal node and on the output node of said last charge pump stage.

2. The negative charge pump circuit according to claim 1, further comprising a plurality of voltage limiting means, each voltage limiting means electrically coupling the output node of the negative charge pump circuit with the internal node of one respective charge pump stage.

3. The negative charge pump circuit according to claim 2 wherein said voltage limiting means further includes a diode-connected transistor.

4. The negative charge pump circuit according to claim 1 wherein each charge pump stage further includes cancellation means for canceling out a threshold voltage drop caused on the output node of the charge pump stage by said pass transistor.

5. The negative charge pump circuit according to claim 4 wherein said cancellation means further includes:
   an initialization transistor with a first terminal and a second terminal respectively connected to the input node and to the output node of the charge pump stage, and with a control terminal connected to the first terminal;
   a pre-charge transistor with a first terminal and a second terminal respectively connected to the input node and to the internal node of the charge pump stage, and with a control terminal connected to the output node of the charge pump stage; and a second coupling capacitor with a first plate connected to the internal node of the charge pump stage and with a second plate connected to a respective clock signal substantially 180° out-of-phase with respect to the clock signal driving the first coupling capacitor.

6. The negative charge pump circuit according to claim 5 wherein said first and second coupling capacitors of the charge pump stages are MOS capacitors with a first plate formed by an insulated gate layer, a second plate formed by an inversion layer formed in a semiconductor region under the insulated gate layer, and a dielectric layer formed by a gate oxide layer insulating said insulated gate layer from the underlying semiconductor region.

7. The negative charge pump circuit according to claim 5 wherein at least in the last charge pump stages said first and second coupling capacitors further include each a pair of serially connected capacitors, a first capacitor of the pair having a first plate formed by an inversion layer in a semiconductor region, a second plate formed by a first polysilicon layer placed over said inversion layer and a dielectric layer formed by a gate oxide layer insulating the first polysilicon layer from the underlying inversion layer, a second capacitor of the pair having a first plate formed by said first polysilicon layer, a second plate formed by a second polysilicon layer placed over the first polysilicon layer and a dielectric layer formed by an interpoly dielectric layer insulating the second polysilicon layer from the underlying first polysilicon layer.

8. The negative charge pump circuit according to claim 5 wherein at least in the first charge pump stages said first and second coupling capacitors comprise each a pair of parallely connected capacitors, a first capacitor of the pair having a first plate formed by an inversion layer in a semiconductor region, a second plate formed by a first polysilicon layer placed over said inversion layer and a dielectric layer formed by a gate oxide layer insulating the first polysilicon layer from the underlying inversion layer, a second capacitor of the pair having a first plate formed by said first polysilicon layer, a second plate formed by a second polysilicon layer placed over the first polysilicon layer and a dielectric layer formed by an interpoly dielectric layer insulating the second polysilicon layer from the underlying first polysilicon layer.

9. A method for producing a negative charge voltage for erasure of a memory cell using a plurality of charge pump stages, comprising the steps of:

a) enabling a reference potential for said plurality of charge pump stages;

b) supplying first and second signals at first time intervals to a first stage of said plurality of charge pump stages and establishing a first negative charge voltage value at a first input node;

c) supplying said first and second signals at second time intervals to said first stage for driving said first negative voltage to a second input node;

d) supplying third and fourth signals at third time intervals to a second stage of said plurality of charge pump stages and establishing a second negative charge voltage value at said second input node, said first and second negative voltages establish a cumulative voltage greater than said first or second negative voltages;

e) supplying said third and fourth signals at fourth time intervals to said second stage for driving said cumulative negative voltage to a third input node;

f) limiting said cumulative negative voltage;

g) regulating said limited cumulative negative voltage; and h) erasing said memory cell using said regulated cumulative negative voltage.

10. The method of claim 9 wherein said steps b) through e) are repeated for additional stages of said plurality of charge pump stages to produce a predetermined cumulative negative voltage.

11. The method of claim 10 further including the step of limiting the predetermined cumulative negative voltage.

12. The method of claim 9 wherein said third time intervals are contained within said second time intervals.

13. The method of claim 12 wherein said first and third time intervals for said first and third signals are less than said first and third time intervals for said second and fourth signals.

14. The method of claim 9 further including the step of canceling a threshold voltage drop during steps c) and e) while driving the negative voltage.

15. The method of claim 9 wherein said second and fourth time intervals for said second and fourth signals are less than said second and fourth time intervals for said first and third signals.

16. A negative charge pump circuit for erasure of a memory cell comprising:

an enablement transistor coupled to a reference potential;

a first stage having input and output nodes and a first threshold voltage cancellation circuit, said input node being coupled to said enablement transistor and said first stage providing a first negative charge pump voltage at said first output node compensated by said first cancellation circuit;

a first pair of clock signals respectively coupled to an intermediate node and said output node of said first stage for driving said first negative charge pump voltage;

a second stage having input and output nodes and a second threshold voltage cancellation circuit, said second input node being coupled to said first output node and said second stage providing a second negative charge pump voltage at said second output node, said second voltage being equal to approximately twice the negative voltage value as said first voltage and includes said first voltage;

a second pair of clock signals coupled to an intermediate node and said output node of said second stage for driving said second negative charge pump voltage; and a voltage regulation circuit being coupled between said second stage output and an erasure voltage output terminal.

17. The negative charge pump circuit of claim 16 further including a voltage limitation circuit coupled between said regulation circuit and said second stage output which limits the second voltage provided to said voltage regulation circuit.

18. The negative charge pump circuit of claim 16 wherein each stage further includes:

a pass transistor having first and second terminals respectively coupled between the input and output nodes, and a control terminal coupled to said intermediate node;

a first coupling capacitor coupled between the internal node and the first clock signal of said pair of clock signals.

19. The negative charge pump circuit of claim 18 wherein said threshold voltage cancellation circuit for each stage further includes:

an initialization transistor having first and second terminals respectively coupled between the input and output nodes, and a control terminal coupled to the first terminal;

a pre-charge transistor having first and second terminals respectively coupled between the input and internal nodes, and a control terminal coupled to the output node; and a second coupling capacitor coupled between the output node and the second clock signal of said pair of clock signals, said second clock signal being substantially 180° out-of-phase with respect to the first clock signal.

20. The negative charge pump circuit of claim 16 wherein said negative charge pump circuit further includes a plurality of first and second stages serially coupled to the respective second output node and at least one limitation circuit coupled between the output node of said plurality of stages and said regulation circuit, each said plurality of first and second stages increases the negative voltage provided to said regulation circuit by the second voltage generated by each first and second stage.

21. The negative charge pump circuit of claim 19 wherein said first and second coupling capacitors of the charge pump stages are MOS capacitors with a first plate formed by an insulated gate layer, a second plate formed by an inversion layer formed in a semiconductor region under the insulated gate layer, and a dielectric layer formed by a gate oxide layer insulating said insulated gate layer from the underlying semiconductor region.

22. The negative charge pump circuit of claim 19 wherein at least in the first charge pump stages said first and second coupling capacitors comprise each a pair of parallel connected capacitors, a first capacitor of the pair having a first plate formed by an inversion layer in a semiconductor region, a second plate formed by a first polysilicon layer placed over said inversion layer and a dielectric layer formed by a gate oxide layer insulating the first polysilicon layer from the underlying inversion layer, a second capacitor of the pair having a first plate formed by said first polysilicon layer, a second plate formed by a second polysilicon layer placed over the first polysilicon layer and a dielectric layer formed by an interpoly dielectric layer insulating the second polysilicon layer from the underlying first polysilicon layer.

* * * * *